US011021577B2

(12) United States Patent
Belosinschi et al.

(10) Patent No.: US 11,021,577 B2
(45) Date of Patent: Jun. 1, 2021

(54) PHOSPHORYLATED LIGNOCELLULOSIC FIBERS, USES AND PROCESSES OF PREPARATION THEREOF

(71) Applicant: 3R VALO, S.E.C., Montréal (CA)

(72) Inventors: Dan Belosinschi, Saint-Étienne des Grès (CA); François Brouillette, Trois-Rivières (CA); Ying Shi, Trois-Rivières (CA); Jean Paradis, Trois-Rivières (CA); Josée Doucet, Trois-Rivières (CA)

(73) Assignee: 3R VALO, S.E.C., Montréal (CA)

( * ) Notice: Subject to any disclaimer, the term of this patent is extended or adjusted under 35 U.S.C. 154(b) by 0 days.

(21) Appl. No.: 16/309,899

(22) PCT Filed: Jun. 12, 2017

(86) PCT No.: PCT/CA2017/050717
§ 371 (c)(1),
(2) Date: Dec. 13, 2018

(87) PCT Pub. No.: WO2017/214719
PCT Pub. Date: Dec. 21, 2017

(65) Prior Publication Data
US 2019/0127533 A1    May 2, 2019

Related U.S. Application Data

(60) Provisional application No. 62/349,207, filed on Jun. 13, 2016.

(51) Int. Cl.
| | |
|---|---|
| *C08H 8/00* | (2010.01) |
| *C02F 1/28* | (2006.01) |
| *C08B 5/00* | (2006.01) |
| *B01J 39/22* | (2006.01) |
| *B01J 20/26* | (2006.01) |
| *D01F 2/24* | (2006.01) |
| *C02F 101/20* | (2006.01) |
| *C02F 103/10* | (2006.01) |
| *B01J 20/24* | (2006.01) |

(52) U.S. Cl.
CPC .............. *C08H 8/00* (2013.01); *B01J 20/265* (2013.01); *B01J 39/22* (2013.01); *C02F 1/286* (2013.01); *C08B 5/00* (2013.01); *D01F 2/24* (2013.01); *B01J 20/24* (2013.01); *C02F 2101/20* (2013.01); *C02F 2103/10* (2013.01)

(58) Field of Classification Search
CPC ........................................................ C08H 8/00
See application file for complete search history.

(56) References Cited

U.S. PATENT DOCUMENTS

| | | | | |
|---|---|---|---|---|
| 3,459,588 A | * | 8/1969 | Davis ................. | D06M 13/292 442/144 |
| 4,331,437 A | * | 5/1982 | Remley .............. | D06M 15/673 427/337 |
| 4,818,598 A | * | 4/1989 | Wong ................... | A61L 15/28 428/326 |
| 5,882,541 A | | 3/1999 | Achtmann | |
| 6,703,496 B1 | * | 3/2004 | Pieschel ................ | C08B 31/00 536/45 |
| 2013/0317138 A1 | * | 11/2013 | Harada .................. | C08L 67/04 524/73 |
| 2016/0115249 A1 | * | 4/2016 | Noguchi ............... | D21H 13/06 536/62 |
| 2017/0226398 A1 | * | 8/2017 | Shimaoka .............. | C09K 8/10 |
| 2017/0226407 A1 | * | 8/2017 | Homma ................. | C09K 8/10 |

FOREIGN PATENT DOCUMENTS

| | | |
|---|---|---|
| CA | 1163163 | 3/1984 |
| CA | 1254731 | 5/1989 |
| CA | 1335578 | 5/1995 |
| CA | 2769986 | 1/2011 |

OTHER PUBLICATIONS

Shi et al., "Phosphorylation of Kraft Fibers with Phosphate Esters", Carbohydrate Polymers 106 (Jan. 31, 2014) 121-127.
Shi et al., "The Properties of Phosphorylated Kraft Fibers", BioResources (May 28, 2015) 10(3), 4375-4390.
Inagaki et al., "Phosphorylation of Cellulose with Phosphorous Acid and Thermal Degradation of the Product", Journal of Applied Polymer Science, vol. 20, 2829-2836 (1976). The year of publication is sufficiently earlier than the effective U.S. filing date so that the particular month of publication is not an issue).
(Continued)

*Primary Examiner* — Liam J Heincer
(74) *Attorney, Agent, or Firm* — Bereskin & Parr LLP/S.E.N.C.R.L., s.r.l.

(57) ABSTRACT

The present disclosure relates to lignocellulosic materials comprising phosphorylated lignocellulosic fibers having an ionic charge in water of about 4000 to about 7000 mmoles/ kg, and processes for the preparation thereof. The process comprises reacting lignocellulosic fibers of a lignocellulosic material with a phosphate ester in the presence of urea. The present disclosure further relates to compositions comprising a phosphate ester and at least one of a defoamer and a viscosity reducer or at least one of a C1-C12 alcohol and an ester of a carboxylic acid.

20 Claims, No Drawings

(56) References Cited

OTHER PUBLICATIONS

Tracy et al., "Commercial Synthesis of Monoalkyl Phosphates", Journal of Surfactants and Detergents, vol. 5, No. 2 (Apr. 2002).
Granja et al., "Cellulose Phosphates as Biomaterials. I. Synthesis and Characterization of Highly Phosphorylated Cellulose Gels", Journal of Applied Polymer Science, vol. 82, 3341-3358 (Jan. 1, 2001).
Belosinschi et al., "Release Paper: Can Phosphate Esters be an Alternative to Silicone?", "Phosphate ester release liner", BioResources 7(1), 902-912 (2012). The year of publication is sufficiently earlier than the effective U.S. filing date so that the particular month of publication is not an issue.).

* cited by examiner

PHOSPHORYLATED LIGNOCELLULOSIC FIBERS, USES AND PROCESSES OF PREPARATION THEREOF

CROSS REFERENCE TO RELATED APPLICATIONS

The present application is a 35 USC 371 national stage entry of PCT/CA2017/050717 filed on Jun. 12, 2017 and which claims priority from U.S. provisional application No. 62/349,207 filed on Jun. 13, 2019. These documents are hereby incorporated by reference in their entirety.

FIELD OF THE DISCLOSURE

The present disclosure relates to lignocellulosic materials and more particularly to lignocellulosic materials comprising phosphorylated lignocellulosic fibers, uses and processes for the preparation thereof.

BACKGROUND OF THE DISCLOSURE

Phosphorylation of cellulosic substrate using phosphoric acid or its derivative as a phosphorylation agent is known. A main drawback however of using phosphoric acid or its derivatives as phosphorylation reagent is the degradation of cellulosic substrates due to excessive acidity of the reaction medium. It has been shown that phosphate esters (PE) also act as phosphorylating agents without causing significant substrate deterioration. Phosporylation reaction with PE has been performed on bleached Kraft fibers (KF) and lignocellulosic fibers from manufacturing of thermomechanical pulp. Moreover, similar results can be obtained using recycled lignocellulosic fibers or any cellulosic substrates from agricultural or forestry activity.

It has been shown that cellulosic substrate can be phosphorylated with phosphate esters (PE) in the presence of an excess of urea following the reaction principle, as proposed by Inagaki et al. (1976) and Pieschel et al. (2004). Theoretically, it is possible to graft one phosphate moiety for each of the three hydroxyls of anhydroglucose unit of cellulose, therefore providing a KF:PE molar ratio of 1:3 in most cases. Urea, which fulfills multiple functions in phosphorylation, can be largely added in excess, the KF:urea molar ratio being 1:17. As described in Shi et al. (2014), the phosphorylation reaction is conducted up to three hours in an anhydrous medium, at an average temperature of 150° C., which slightly exceeds the melting point of urea. Finally, the fibers are washed thoroughly with water and ethanol and air dried.

There is thus a need to provide alternative processes or reactants for phosphorylation and/or to improve at least one aspect of the prior art processes.

SUMMARY OF THE DISCLOSURE

According to an aspect of the present disclosure, there is provided a lignocellulosic material comprising phosphorylated lignocellulosic fibers, wherein the fibers have an ionic charge in water of about 4000 to about 7000 mmoles/kg.

According to another aspect of the present disclosure, there is provided a lignocellulosic material comprising phosphorylated lignocellulosic fibers, wherein the fibers have an average fiber length of about 0.5 to about 5 mm.

According to another aspect of the present disclosure, there is provided a lignocellulosic material comprising phosphorylated lignocellulosic fibers.

According to another aspect of the present disclosure, there is provided a process for preparing a phosphorylated lignocellulosic material comprising phosphorylated lignocellulosic fibers, the process comprising:
reacting lignocellulosic fibers of a lignocellulosic material with a phosphate ester in the presence of urea.

According to another aspect of the present disclosure, there is provided a process for preparing a phosphorylated lignocellulosic material comprising phosphorylated lignocellulosic fibers, the process comprising:
reacting lignocellulosic fibers of a lignocellulosic material with a phosphate ester in the presence of an activating agent.

According to a further aspect of the present disclosure, there is provided a composition comprising:
a phosphate ester; and
at least one of a defoamer and a viscosity reducer.

Another aspect herein described relates to a composition comprising:
a phosphate ester; and
at least one of a C1-C12 alcohol and an ester of a carboxylic acid.

According to another aspect, there is provided the use of a composition as defined in the present disclosure as a phosphorylation reagent.

According to another aspect, there is provided the use of a composition as defined in the present disclosure for phosphorylating a lignocellulosic material.

According to another aspect, there is provided the use of a composition as defined in the present disclosure in the manufacture of phosphorylated lignocellulosic fibers.

According to another aspect, there is provided a method of using a composition according to the present disclosure. The method comprises reacting the composition with a lignocellulosic material comprising lignocellulosic fibers so as to at least partially phosphorylate the lignocellulosic fibers.

According to another aspect, there is provided a method for insulating a building comprising inserting or injecting into at least a wall, floor or ceiling of the building the lignocellulosic material comprising phosphorylated lignocellulosic fibers of the present disclosure.

According to another aspect, there is provided a method for extracting heavy metal ions from an aqueous composition, said method comprising:
contacting said aqueous composition with the lignocellulosic material comprising any phosphorylated lignocellulosic fibers of the present disclosure so as to obtain a mixture; and
filtering said mixture so as to separate the lignocellulosic material comprising phosphorylated lignocellulosic fibers comprising heavy metal ions connected thereto from said aqueous composition and recovering said aqueous composition at least partially depleted in heavy metal ions.

According to another aspect, there is provided a method for insulating a building comprising inserting or injecting into at least a wall, floor or ceiling of said building the lignocellulosic material comprising phosphorylated lignocellulosic fibers of the present disclosure.

According to another aspect, there is provided a method for manufacturing a peat moss product comprising mixing together peat moss and the lignocellulosic material comprising phosphorylated lignocellulosic fibers of the present disclosure.

According to another aspect, there is provided a composition comprising:

any phosphorylated lignocellulosic fibers of the present disclosure; and peat moss.

According to another aspect, there is provided a composition comprising:

phosphorylated lignocellulosic fibers of the present disclosure;

a surfactant; and peat moss.

It has been found that the compositions and processes of the present disclosure are effective for preparing phosphorylated lignocellulosic fibers without however substantially damaging the fibers. In fact, it has been observed that by using the compositions and/or processes of the present disclosure, it is possible to carry out phosphorylation of lignocellulosic fibers by maintaining the integrity of the fibers. For example, the average length of the fibers can be substantially maintained. For example, the diameter of the fibers can be substantially maintained. For example, the fine content of the fibers can be substantially maintained.

DETAILED DESCRIPTION OF THE DISCLOSURE

Non-limiting examples of the present disclosure are hereby provided.

The terms "suitable" and "appropriate" mean that the selection of the particular group or conditions would depend on the specific synthetic manipulation to be performed and the identity of the molecule but the selection would be well within the skill of a person trained in the art. All process steps described herein are to be conducted under conditions suitable to provide the product shown. A person skilled in the art would understand that all reaction conditions, including, for example, reaction solvent, reaction time, reaction temperature, reaction pressure, reactant ratio, can be varied to optimize the yield of the desired product and it is within their skill to do so.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of ±10% of the modified term if this deviation would not negate the meaning of the word it modifies.

As used in this specification and the appended claims, the singular forms "a", "an" and "the" include plural references unless the content clearly dictates otherwise. Thus for example, a composition containing "a compound" includes a mixture of two or more compounds. It should also be noted that the term "or" is generally employed in its sense including "and/or" unless the content clearly dictates otherwise.

The definitions and embodiments described in particular sections are intended to be applicable to other embodiments herein described for which they are suitable as would be understood by a person skilled in the art.

The recitation of numerical ranges by endpoints herein includes all numbers and fractions subsumed within that range (e.g. 1 to 5 includes 1, 1.5, 2, 2.75, 3, 3.90, 4, and 5).

It is also to be understood that all numbers and fractions thereof are presumed to be modified by the term "about."

The expression "substantially maintained", when referring to a value of the average length of the lignocellulosic fibers, the diameter of the lignocellulosic fibers or the fine content of the lignocellulosic fibers refers to a value that is modified by a maximum of 10% (i.e. modified by 10% or less). For example, it was found that by using the compositions and/or processes of the present disclosure, it was possible to carry out phosphorylation of lignocellulosic fibers by substantially maintaining at least one of the value of the average length of the lignocellulosic fibers, the value of the diameter of the lignocellulosic fibers or the value of the fine content of the lignocellulosic fibers. For example, it was found that pursuant to such processes or use of such compositions, the value of the average length of the phosphorylated lignocellulosic fibers, the value of the diameter of the phosphorylated lignocellulosic fibers or the value of the fine content of the phosphorylated lignocellulosic fibers is at least 90% or 95% of the corresponding value of the untreated or unphosphorylated fibers.

For example, the fibers can have an ionic charge in water of about 4500 to about 6500 mmoles/kg.

For example, the fibers can have an ionic charge in water of about 5000 to about 6500 mmoles/kg.

For example, the fibers can have an ionic charge in water of about 5000 to about 6000 mmoles/kg.

For example, the fibers can have an ionic charge in water of about 4000, about 4250, about 4500, about 4750, about 5000, about 5250, about 5500, about 5750, about 6000, about 6250, about 6500, about 6750, or about 7000 mmoles/kg.

For example, the fibers can have an average fiber length of about 0.5 to about 5 mm.

For example, the fibers can have an average fiber length of about 0.5 to about 4 mm.

For example, the fibers can have an average fiber length of about 0.8 to about 3 mm.

For example, the fibers can have an average fiber length of about 1 to about 4 mm.

For example, the fibers can have an average fiber length of about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9 or about 5.0 mm.

For example, the material, when reacted with water, is effective for absorbing about 30 to about 60 times its own weight of water.

For example, the material, when reacted with water, is effective for absorbing about 30 to about 50 times its own weight of water.

For example, the material, when reacted with water, is effective for absorbing about 35 to about 45 times its own weight of water.

For example, the material, when reacted with water, is effective for absorbing about 30, about 32, about 34, about 36, about 38, about 40, about 42, about 44, about 46, about 48 or about 50 times its own weight of water.

For example, the material has a phosphorus content of about 9 to about 17% (w/w).

For example, the material has a phosphorus content of about 9 to about 15% (w/w).

For example, the material has a phosphorus content of about 9 to about 13% (w/w).

For example, the material has a phosphorus content of about 9, about 10, about 11, about 12, about 13, about 14 or about 15% (w/w).

For example, the material has a Limit Oxygen Index of at least about 23.

For example, the material has a Limit Oxygen Index of at least about 25.

For example, the material has a Limit Oxygen Index of at least about 27.

For example, the material has a Limit Oxygen Index of at least about 25, at least about 27, at least about 30, at least about 35, at least about 40, at least about 45, at least about 50, at least about 55 or at least about 60.

For example, the material has a Limit Oxygen Index of about 25 to about 75.

For example, the material has a Limit Oxygen Index of about 25 to about 60.

For example, the material has a Limit Oxygen Index of about 27 to about 60.

For example, the material has a Limit Oxygen Index of about 30 to about 60.

For example, the material has a Limit Oxygen Index of about 25 to about 65.

For example, the material has a Limit Oxygen Index of about 25 to about 60.

For example, the material has a Limit Oxygen Index of about 25 to about 55.

For example, the material has a metal adsorption capacity of at least 1.7 mmoles/g for at least one heavy metal.

For example, the material has a metal adsorption capacity of about 1.7 to about 2.9 mmoles/g for at least one heavy metal.

For example, the material has a metal adsorption capacity of about 1.5 to about 3.5 mmoles/g for at least one heavy metal.

For example, the material has a metal adsorption capacity of about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4 or about 3.5 mmoles/g for at least one heavy metal.

For example, the at least one heavy metal is chosen from Ni, Cu, Cd and Pb.

For example, the at least one heavy metal is chosen from Fe, Cu, Mn, Co, Ni and Cd.

For example, the lignocellulosic material is effective for extracting at least 90% of at least one heavy metal contained in a waste water that has a concentration of about 1 to about 1000 ppm in said at least one heavy metal.

For example, the lignocellulosic material is effective for extracting at least 95% of at least one heavy metal contained in a waste water that has a concentration of about 1 to about 1000 ppm in said at least one heavy metal.

For example, the lignocellulosic material is effective for extracting about 100% of at least one heavy metal contained in a waste water that has a concentration of about 1 to about 1000 ppm in said at least one heavy metal.

For example, the fibers are phosphorylated Kraft fibers.

For example, the fibers can be hybrid phosphorylated Kraft fibers comprising an ammonium ion and/or a sodium ion and hydrogen counter-ions on phosphate groups (for example on substantially each phosphate group).

For example, the lignocellulosic material has a charge excess of 10% based on the total ionic charge of the metal ions present in the material.

For example, the fibers can be acid phosphorylated Kraft fibers having two hydrogen counter-ions on phosphate groups (for example on substantially each phosphate group).

For example, the fibers can be sodium phosphorylated Kraft fibers having two sodium counter-ions on the phosphate groups (for example on substantially each phosphate group).

The person skilled in the art will readily understand that urea can be used as an in situ ammonia generation agent. Other suitable agents that generate ammonia can be used as well.

For example, the lignocellulosic material is a sheet, a panel, wood or fibers.

For example, the process can comprise reacting the lignocellulosic fibers of a lignocellulosic material with a mixture comprising the phosphate ester and an activation agent.

For example, the process can comprise reacting the lignocellulosic fibers of a lignocellulosic material with a mixture comprising the phosphate ester and urea.

For example, the mixture has a molar ratio, the phosphate ester/urea of about 1/about 2 to about 6.

For example, the phosphate ester/urea molar ratio is about 1/about 2, about 1/about 2.5, about 1/about 3, about 1/about 3.5, about 1/about 4, about 1/about 4.5, about 1/about 5, about 1/about 5.5, or about 1/about 6.

For example, the process can comprise reacting the lignocellulosic fibers of a lignocellulosic material with a mixture comprising the phosphate ester and urea at a molar ratio lignocellulosic fibers/phosphate ester/urea of about 1/about 1.1 to about 4/about 5 to about 20.

For example, the lignocellulosic fibers/phosphate ester/urea molar ratio can be about about 1/about 1.1/about 5, about 1/about 1.1/about 6, about 1/about 1.1/about 7, about 1/about 1.1/about 8, about 1/about 1.1/about 9, about 1/about 1.1/about 10, about 1/about 1.1/about 12, about 1/about 1.1/about 14, about 1/about 1.1/about 16, about 1/about 1.1/about 18, about 1/about 1.1/about 20, 1/about 2/about 5, about 1/about 2/about 5, about 1/about 3/about 5, about 1/about 4/about 5, about 1/about 2/about 6, about 1/about 2/about 7, about 1/about 2/about 8, about 1/about 2/about 10, about 1/about 2/about 12, about 1/about 2/about 14, about 1/about 2/about 16, about 1/about 2/about 18, about 1/about 2/about 20, 1/about 4/about 5, about 1/about 4/about 5, about 1/about 3/about 5, about 1/about 4/about 5, about 1/about 4/about 6, about 1/about 4/about 7, about 1/about 4/about 8, about 1/about 4/about 10, about 1/about 4/about 12, about 1/about 4/about 14, about 1/about 4/about 16, about 1/about 4/about 18, or about 1/about 4/about 20, For example, the mixture can be at a temperature of about 125 to about 185° C.

For example, the mixture can be at a temperature of about 130 to about 180° C.

For example, the mixture can be at a temperature of about 140 to about 170° C.

For example, the mixture can be at a temperature of about 125, about 130, about 135, about 140, about 145, about 150, about 155, about 160, about 165, about 170, about 175, about 180, about 185 or about 190° C.

For example, the mixture further comprises at least one of a defoamer and a viscosity reducer.

For example, the mixture further comprises at least one C1-C12 alcohol.

For example, the mixture further comprises at least one C1-C6 alcohol.

For example, the mixture further comprises at least one ester of a carboxylic acid.

For example, the mixture further comprises at least one ester of a C1-C22 carboxylic acid.

For example, the mixture further comprises at least one ester of a C1-C16 carboxylic acid.

For example, the mixture further comprises at least one ester of a C1-C12 carboxylic acid.

For example, the mixture further comprises at least one ester of a C6-C12 carboxylic acid.

For example, the mixture further comprises at least one ester of a C8-C12 carboxylic acid.

For example, the at least one ester is a methyl, ethyl, propyl, butyl, pentyl or hexyl ester of the carboxylic acid.

For example, the at least one ester is a C1-C12 ester of the carboxylic acid.

For example, the phosphate ester comprises at least 65, at least 66, at least 67, at least 68, at least 69, at least 70, at least 71, at least 72, at least 73, at least 74, at least 75, at least 76, at least 77, at least 78, at least 79 or at least 80% (w/w) of the phosphate in the form of a mono-ester phosphate.

For example, the fibers are added into the mixture.

For example, the lignocellulosic material is a sheet, a panel, wood or fibers.

For example, the lignocellulosic material is a sheet, a panel or wood and the fibers are impregnated with the mixture.

For example, the mixture further comprises water.

For example, the phosphate ester is obtained by reacting phosphoric acid with a C1-C22 alcohol.

For example, the phosphate ester is obtained by reacting phosphoric acid with a C1-C12 alcohol.

For example, the phosphate ester is a phosphate ester chosen from C6-C22 phosphate esters.

For example, the phosphate ester is a phosphate ester chosen from C6-C18 phosphate esters.

For example, the phosphate ester is a C12 phosphate ester.

For example, the phosphorylated fibers are hydrogen ammonium phosphate.

For example, the phosphorylated fibers are phosphorylated Kraft fibers.

For example, the process further comprises treating phosphorylated fibers with HCl.

For example, the process further comprises treating phosphorylated fibers with NaOH or KOH.

For example, the process provides a phosphorus content of at least 9, at least 10, at least 11, at least 12, at least 13, at least 14 or at least 15% (w/w) to the phosphorylated lignocellulosic material.

For example, the process provides a phosphorus content of about 9 to about 15% (w/w) to the phosphorylated lignocellulosic material.

For example, the process provides a phosphorus content of about 9 to about 13% (w/w) to the phosphorylated lignocellulosic material.

The process herein described provides an increase in the phosphorylation yield. The skilled person will readily understand that the phosphorylation yield represents the weight gain of the fiber substrate after phosphorylation.

For example, the process provides a phosphorylation yield of at least 15, at least 20, at least 25, at least 30, at least 35, at least 40, at least 45 or at least 50%.

For example, the process provides a phosphorylation yield of about 20 to about 50%.

For example, the process provides a phosphorylation yield of about 22 to about 45%.

The presently described process further provides an increase in the phosphorylation efficiency which readily understood as the amount of phosphorus from phosphate esters that is grafted to the fibers.

For example, the process provides a phosphorylation efficiency of at least 20, at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, at least 49, at least 50, at least 51, at least 52, at least 53, at least 54, at least 55, at least 56, at least 57, at least 58, at least 59, at least 60, at least 61, at least 62, at least 63, at least 64, at least 65 or at least 70%.

For example, the process provides a phosphorylation efficiency of about 20 to about 70%.

For example, the process provides a phosphorylation efficiency of about 20 to about 60%.

For example, the process provides a phosphorylation efficiency of about 20 to about 60%.

For example, the process provides a phosphorylation efficiency of about 30 to about 60%.

For example, the process provides a phosphorylation efficiency of about 29 to about 56%.

For example, the process provides a phosphorylation efficiency of about 43 to about 56%.

The lignocellulosic materials comprising phosphorylated lignocellulosic fibers as described herein can be used in various applications.

For example, the lignocellulosic material comprising phosphorylated lignocellulosic fibers is used in the manufacture of a fireproof material.

For example, the lignocellulosic material comprising phosphorylated lignocellulosic fibers is used as a fireproof material.

For example, the lignocellulosic material comprising phosphorylated lignocellulosic fibers is used for trapping at least one metal.

For example, the lignocellulosic material comprising phosphorylated lignocellulosic fibers is used for carrying out ion exchange.

For example, the lignocellulosic material comprising phosphorylated lignocellulosic fibers is used for water absorption.

For example, the lignocellulosic material comprising phosphorylated lignocellulosic fibers is used as a hydrogel.

For example, the lignocellulosic material comprising phosphorylated lignocellulosic fibers is used for waste water treatment.

For example, the lignocellulosic material comprising phosphorylated lignocellulosic fibers is used for papermaking.

For example, the lignocellulosic material comprising phosphorylated lignocellulosic fibers is used in diaper manufacturing.

For example, the lignocellulosic material comprising phosphorylated lignocellulosic fibers is used in the manufacture of a wood-based panel or fiber-based panel.

For example, the wood-based panel is chosen from high density fiberboards, medium density fiberboards, particle board, laminated wood, plywood and Wood Plastic Composite (WPC).

For example, the lignocellulosic material comprising phosphorylated lignocellulosic fibers is used in the manufacture of peat moss.

For example, the lignocellulosic material comprising phosphorylated lignocellulosic fibers is used in the manufacture of a peat moss product or a peat moss composition.

For example, the lignocellulosic material comprising phosphorylated lignocellulosic fibers is used together with a surfactant in the manufacture of a peat moss product or a peat moss composition.

For example, the lignocellulosic material comprising phosphorylated lignocellulosic fibers is used in the manufacture of a peat moss product or a peat moss composition.

For example, the lignocellulosic material comprising phosphorylated lignocellulosic fibers is used as a wetting agent in the manufacture of a peat moss product.

For example, the lignocellulosic material comprising phosphorylated lignocellulosic fibers is used for wetting peat moss.

For example, the lignocellulosic material comprising phosphorylated lignocellulosic fibers is used as a wetting agent.

For example, the lignocellulosic material comprising phosphorylated lignocellulosic fibers is used in the manufacture of a heat insulation material.

For example, the lignocellulosic material comprising phosphorylated lignocellulosic fibers is used in the manufacture of a sound insulation material.

For example, the lignocellulosic material comprising phosphorylated lignocellulosic fibers is used in the manufacture of an anti-adhesive surface.

The present disclosure further provides reagents that can be used for the phosphorylation reaction of lignocellulosic fibers of lignocellulosic materials.

For example, the phosphate ester is a phosphate ester chosen from C6-C22 phosphate esters.

For example, the phosphate ester is a phosphate ester chosen from O6-O18 phosphate esters.

For example, the phosphate ester is a C12 phosphate ester.

For example, the composition comprises less than 20, less than 19, less than 18, less than 17, less than 16, less than 15, less than 14, less than 13, less than 12, less than 11, less than 10, less than 9, less than 8, less than 7, less than 6 or less than 5% (w/w) of the phosphate ester in the form of a di-ester.

For example, the composition comprises at least 70, at least 71, at least 72, at least 73, at least 74, at least 75, at least 76, at least 77, at least 78, at least 79, at least 80, at least 81, at least 82, at least 83, at least 84, at least 85, at least 86, at least 87, at least 88, at least 89 or at least 90% (w/w) of the phosphate ester in the form of a mono-ester.

For example, the composition comprises less than 10, less than 9, less than 8, less than 7, less than 6 or less than 5% (w/w) of phosphoric acid.

For example, the composition comprises about 0.1 to about 15%, about 1 to about 15%, about 1 to about 12%, about 1 to about 10%, or about 2 to about 10% (w/w) of a C1-C6 alcohol.

For example, the composition comprises about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, about 10, about 11, about 12, about 13, about 14 or about 15% (w/w) of a C1-C6 alcohol.

For example, the C1-C6 alcohol is methanol or ethanol.

For example, the composition comprises about 0.1 to about 15%, about 1 to about 15%, about 1 to about 12%, about 1 to about 10%, or about 2 to about 10% (w/w) of an ester of a carboxylic acid.

For example, the composition comprises about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, about 10, about 11, about 12, about 13, about 14 or about 15% (w/w) of an ester of a carboxylic acid.

For example, the carboxylic acid is a C1-C22 carboxylic acid.

For example, the carboxylic acid is a C1-C16 carboxylic acid.

For example, the carboxylic acid is a C6-C12 carboxylic acid.

For example, the carboxylic acid is a C8-C12 carboxylic acid.

For example, the at least one ester of a carboxylic acid is a methyl, ethyl, propyl, butyl, pentyl or hexyl ester of the carboxylic acid.

For example, the at least one ester of a carboxylic acid is a C1-C12 ester of the carboxylic acid.

For example, the composition is used as a phosphorylation reagent.

For example, the composition is used for phosphorylating a lignocellulosic material.

For example, the composition is used in the manufacture of phosphorylated lignocellulosic fibers.

For example, wherein the method of use of the composition comprise diluting the composition with water and then impregnating said lignocellulosic with said diluted composition.

For example, the diluted composition comprises about 25 to about 45% w/w of said composition.

For example, the diluted composition comprises about 30 to about 40% w/w of said composition.

For example, in method for extracting heavy metal ions from an aqueous composition, the mixture has a pH of about 1 to about 4, about 2 to about 4 or about 2 to about 3.

For example, in method for extracting heavy metal ions from an aqueous composition, the mixture has a pH of about 1 to about 4, about 2 to about 4 or about 2 to about 3.

For example, the composition comprises about 70 to about 95%, about 75 to about 95%, about 85 to about 95% or about 75 to about 90% by weight of peat moss.

For example, the composition comprises about 5 to about 30%, about 5 to about 20%, about 5 to about 15% or about 10 to about 25% by weight of the lignocellulosic material comprising phosphorylated lignocellulosic fibers, For example, the composition comprises a surfactant. For example, the surfactant can have dosage of at a dosage of about 200 to about 1200 mL/m$^3$, about 400 to about 1000 mL/m$^3$ or about 600 to about 800 mL/m$^3$ It will be appreciated by a person skilled in the art that embodiments relating to the lignocellulosic materials and the processes of preparation and uses thereof, as well compositions herein described can be varied as detailed herein.

The following examples are non-limitative and are used to better exemplify the materials and processes of the present disclosure.

Examples

Product Characterization

It was found that the compositions and processes of the present disclosure are effective for preparing phosphorylated lignocellulosic fibers without however substantially damaging the fibers. In fact, it was observed that by using the compositions and processes of the present disclosure, it was possible to carry out phosphorylation of lignocellulosic fibers by maintaining the integrity of the fibers. For example, it was found that the average length of the fibers was substantially maintained. For example, it was found that the diameter of the fibers was substantially maintained. For example, it was found that the fine content of the fibers was substantially maintained.

Preliminary attempts of phosphorylation reaction have been made using two linear and saturated phosphate esters, namely with 8 carbons (PEC8) and 18 carbons (PEC18) in the aliphatic chain. Such teachings of phosphate esters synthesis, purification and characterization; phosphorylation pathway; phosphorylated Kraft fibers (KFP) characterization and properties; are largely described in Shi et al. (2014) and Shi et al. (2015). These papers also describe analyses which can be used to easily assess the efficiency of PEs as new phosphorylation reagents, including the following:

Phosphorylation yield [η (%)] which represents the weight gain of the cellulose substrate after phosphorylation:

$$\eta = \frac{w_{KFP} - w_{KF}}{w_{KF}} \times 100$$

where 
$\begin{cases} w_{KF} & : \text{weight of Kraft fibers before phosphorylation (g)} \\ w_{KFP} & : \text{weight of Kraft fibers after phosphorylation (g)} \end{cases}$ Phosphorus content [P (%)] which is calculated in two steps: the KFP sample is firstly digested and then the phosphate concentration is measured by ultraviolet-visible (UV-Vis) absorption spectroscopy. A complete description of this method is described in Belosinschi (2014).

$$P = 0.0653 \times \frac{C_{PO_4^{2-}}}{w_{KFP}}$$

where 
$\begin{cases} C_{PO_4^{2-}} & : \text{phosphate concentration (mg/L)} \\ w_{KFP} & : \text{weight of } KFP \text{ sample(g)} \end{cases}$ Phosphorylation efficiency [E (%)] which shows how much of phosphorus from PE is finally grafted to the KF substrate:

$$E = \frac{DS}{R_{PE/KF}} \times 100$$

where 
$\begin{cases} DS & : \text{degree of substitution of } KFP \text{ sample} \\ R_{PE/KF} & : \text{molar ratio of phosphate ester to Kraft fibers} \end{cases}$ The substitution degree (DS) which is related to the phosphorus content (P) of KFP sample by the following relation:

$$DS = \frac{162 \times P}{3100 - 97 \times P}$$

Materials and Methods

Raw Materials

The phosphorylation reaction can be carried out on any substrate containing a significant amount of cellulose. The substrates which were evaluated are wood (pine and maple), wood pulp fibers (chemical, thermomechanical and recycled) and plant fibers (cotton and flax).

The cellulosic substrate can be treated in various forms including dust, pulps, sheets, panels or wood. As such, the application technique of the reagent will vary depending on the form of the substrate.

Reagents

In addition to the cellulosic substrate, the phosphorylation reaction involves the following reagents:

1. Phosphate ester: Linear and saturated phosphate esters in their acid form, with the aliphatic chain length between 6 and 18 carbon atoms. Preferably, the phosphate ester has a composition of more than 70% (w/w) mono-ester phosphate, less than 20% (w/w) di-ester phosphate and a maximum of 10% (w/w) unreacted phosphoric acid.
2. Urea: Is added in excess with regard to phosphate esters. The added amount (molar ratio) of urea is 2 to 6 times more than the phosphate ester used.
3. Short chain alcohol (methanol or ethanol): These chemical compounds act as solvents, defoamers and viscosity reducers and up to 15% (w/w) were introduced in the phosphate ester formulations.
4. Carboxylic esters: These chemical compounds act as defoamers and viscosity reducers and up to 20% (w/w) were introduced in the phosphate ester formulations. The carboxylic esters with an aliphatic chain length between 8 and 12 carbon atoms, e.g. methyl octanoate (C1C8 carboxylic acid ester) or methyl dodecanoate (C1C12 carboxylic acid ester), can be mixed to a synthesized phosphate ester.

Reaction with Fibers

The phosphate ester and urea are heated in an oven at a temperature of about 140° C. to about 170° C. The fibers are added to the phosphate ester/urea blend under constant mixing to obtain a homogenous contact of all reagents. The reaction is conducted for a minimum of one hour and a maximum of three hours in this anhydrous environment. Finally, the fibers are washed thoroughly with water and ethanol and air dried.

Reaction with a Sheet, a Panel or Wood

The same composition of phosphorylation reagent is applicable whether the reaction is performed on sheets, panels, wood or fibers. In order to preserve the pre-set structure of sheets, panels and wood, the substrate impregnation with phosphorylation reagent is done by filtration at room temperature. However, the urea is previously dissolved in water since it is solid at room temperature. Therefore, an impregnation solution is made by mixing about 30 to about 40% (w/w) phosphorylation reagent or composition with water. The reaction period increases in this case because the evaporation of water takes extra time.

Post-Reaction Treatments

After the reaction, the fibers are obtained in a hybrid form (hydrogen ammonium phosphate). At this point, the fibers can be used for flame retardant and ion exchange applications. For other applications such as water absorption or ion exchange, the performance of the product can be improved by changing the counter-ions of the grafted phosphate. Subsequent treatments with diluted aqueous solution of acid (HCl) and alkali (NaOH) allow to obtain the phosphorylated fibers in their sodium form. Scheme 1 below represents chemical reactions previously discussed during preparation of phosphorylated kraft fibers and their different forms.

Scheme 1. Synthesis of KFP and different forms thereof

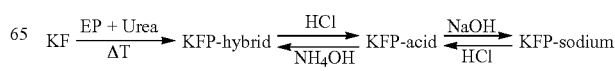

-continued

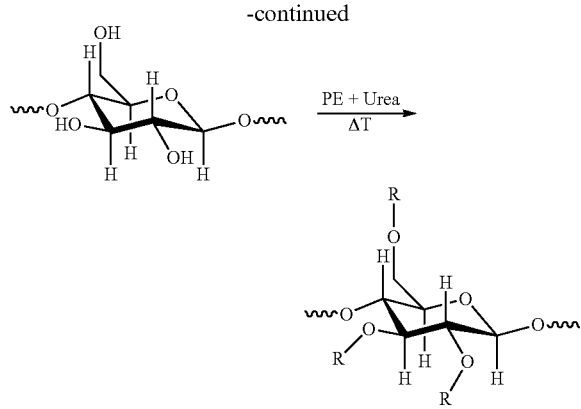

R = H or [PO$_3^{2-}$X$^+$Y$^+$]
KFP-hybrid: X = H$^+$/Y = NH$_4^+$
KFP-acid: X = Y = H$^+$
KFP-sodium: X = Y = Na$^+$ Results and Discussion Table 1 shows the characteristics of phosphorylated Kraft fiber (KFP) samples obtained using PEC8 and PEC18 as phosphorylation reagents. These results clearly confirm the potential of phosphate esters to react with cellulose substrates. For example, the KFP with a phosphorus content up to 9% can be adequate for some applications like flame retardant. However, only 23% of phosphorylation efficiency can eventually cause environmental issues. Therefore, new recipes based on phosphate esters were tested in order to maximize the phosphorylation results.

TABLE 1

Phosphorylation results using phosphate esters

|  | PEC8 | PEC18 |
|---|---|---|
| η (%) | 19 | 11 |
| P (%) | 9.23 | 7.17 |
| E (%) | 22.61 | 16.11 |

As can be seen in Table 1, the phosphorylation yield (η (%)), phosphorus content (P (%)) and phosphorylation efficiency (E (%)) appear to decrease upon increasing the aliphatic chain length of phosphate ester. Without wishing to be bound by such a theory, it was found that this trend is mainly due to the viscosity of phosphate esters which increases as the aliphatic chain length increases. The capacity of the Kraft fibers to soak a more viscous phosphate ester appears to decrease with phosphorylation with PEC18.

In order to reduce reagent viscosity, the phosphate esters were ethoxylated. An average of three ethoxylate molecules were bound to two phosphate esters, with 10 and 12 carbons in the aliphatic chain. The phosphorylation results with these reagents, namely PEC10C6 and PEC12C6 respectively, are shown in Table 2.

TABLE 2

Phosphorylation results using ethoxylated phosphate esters

|  | PEC10C6 | PEC12C6 |
|---|---|---|
| η (%) | 29 | 22 |
| P (%) | 10.86 | 9.73 |
| E (%) | 28.65 | 24.37 |

The ethoxylation of phosphate esters improves the phosphorylation process when comparing Table 2 vs. Table 1 results. Yet, the ethoxyl moiety does not interfere in the phosphorylation mechanism, it only reduces the viscosity of the reaction medium. It appears that a low viscosity of the phosphate ester reagents is a prerequisite for improving the overall efficiency of phosphorylation reaction.

In addition, chemical compounds acting as defoamers and viscosity reducers were introduced in the phosphate ester formulations. Methanol (CH$_3$OH), up to 15% (w/w), and methyl dodecanoate (C1C12 carboxylic acid ester), up to 20% (w/w), were mixed to a synthesized phosphate ester with 12 carbons in the aliphatic chain (PEC12). This time, the PEC12 was obtained by reacting a fatty alcohol 1-dodecanol (C12OH) with polyphosphoric acid (115% H$_3$PO$_4$ basis). The choice of polyphosphoric acid over phosphorus pentoxide was made so as to avoid the formation of diester phosphate as by-product (Tracy et al., 2002) which further increases the viscosity of synthesized PEC12.

Table 3 shows the phosphorylation results of Kraft fibers with the PEC12 mixture at different molar ratios. The PEC12 mixture is the first phosphorylation reagent with a phosphorylation efficiency exceeding 50%. Accordingly, the water pollution is significantly reduced as the amount of phosphate discharged during the KFP washing stage is limited. Another major advantage is that the phosphorylation results can be easily modulated by changing the molar ratio of reactants. The amount of phosphate ester used can be chosen depending on the final application of phosphorylated fibers. This limits the wastes and allows a more judicious use of reagents.

TABLE 3

Phosphorylation results using viscosity reducers/phosphate ester mixture

| KF/PEC12/urea (molar ratio) | 1/1.5/8.5 | 1/2/11.5 | 1/3/17 |
|---|---|---|---|
| η (%) | 22 | 36 | 45 |
| P (%) | 9.73 | 11.79 | 12.91 |
| E (%) | 56.06 | 56.15 | 43.41 |

These changes in phosphate ester formulation simplify the phosphorylation process and ultimately increase the reaction yield and efficiency. Finally, almost all the chemical compounds contained in the PEC12 mixture, i.e. methanol, methyl dodecanoate and 1-dodecanol can be biosourced.

Various Applications

Flame retardant. The phosphorylated lignocellulosic fibers can act themselves as a flame retardant or can be part of manufacturing of fireproof materials. The LOI (Limit Oxygen Index) values of phosphorylated Kraft fibers with two phosphate esters are shown in Table 4. As can be seen, all LOI values are greater than 27, regardless the form of phosphorylated fibers and the phosphorylation reagent. A material is considered an excellent flame retardant if the LOI is greater than 25. The LOI value for untreated cellulosic fibers is 19, which means that it burns easily.

TABLE 4

LOI values for the phosphorylated Kraft fibers with PEC8 and PEC18

| Fiber form | PEC8 | PEC18 |
|---|---|---|
| Hydrogen ammonium | 57 | 30 |
| Dihydrogen | 35 | 27 |
| Disodium | 29 | 28 |

Ion Exchange.

The phosphorylated Kraft fibers are characterized by a high anionic charge in water (up to 5000-6000 mmoles/Kg) which indicates advantageous adsorption capacity of heavy metal cations. Table 5 shows the adsorption capacity of phosphorylated Kraft fibers for different cations. The results of two commercially available ion exchange resins (Dowex™ 50 WX2-400 and Dowex™ Marathon C) are also presented for comparison.

TABLE 5

Adsorption capacity (mmoles/g) of KFP forms for different heavy metals

| | KFP-hybrid | KFP-acid | KFP-sodium | Dowex™ 50WX2-400 | Dowex™ Marathon C |
|---|---|---|---|---|---|
| Ni | 2.4 | 1.9 | 2.8 | 2.4 | 2.5 |
| Cu | 2.5 | 2.0 | 2.8 | 2.4 | 2.5 |
| Cd | 2.3 | 1.7 | 2.7 | 2.5 | 2.5 |
| Pb | 2.7 | 2.5 | 2.9 | 2.5 | 2.6 |

The adsorption capacities of phosphorylated Kraft fibers are comparable to those of commercially available resins. Actually, the cation adsorption capacity is slightly lower for the KFP-acid form, comparable for the -hybrid form and higher for the -sodium form than that of the two evaluated commercially available ion exchange resins.

Wastewater Treatment.

KFP have been used to extract heavy metal ions from an industrial process water. The sample, obtained from the mining industry, contained heavy metal ions and hydrofluoric acid (pH 2.4). The total amount of metal ions found in the sample was determined by ICP-OES. An amount of KFP, hybrid form, corresponding to a charge excess of 10% (based on the total ionic charge of the metal ions present in the sample) was added to the wastewater sample. It was stirred at low speed for 30 minutes at 20° C. The fibers were then filtered and the filtrate was analyzed by ICP-OES to determine the removal efficiency for several metal ions. The results are shown in Table 6. All tested heavy metals were removed from the solution (93-100% removal) except for chromium which was in anionic form (negatively charged) at pH 2.4.

TABLE 6

Removal efficiency of KFP hybrid form for different heavy metals found in a mining industry process water

| Metal ions | Cu | Fe | Mn | Co | Ni | Cr | Cd |
|---|---|---|---|---|---|---|---|
| Concentration before treatment (ppm) | 22 | 830 | 10.5 | 3.6 | 226 | 77 | 0 |
| Concentration after treatment (ppm) | <0.5 | 1 | <0.5 | <0.5 | 16 | 45 | 0 |
| Removal efficiency (%) | 100 | 100 | 100 | 100 | 93 | 42 | 100 |

Water Absorption.

One of the main properties of phosphorylated Kraft fibers is the great polarity generated by grafting phosphate moieties. These groups have an absorption capacity of water much higher than the equivalent hydroxyl groups of cellulose. In some conditions, the phosphate groups may be at the origin of the formation of a hydrogel based phosphorylated fibers. The results obtained so far show that this hydrogel is capable to retain up to 40 times more water than its weight. Possible applications for these highly water absorbent fibers include for example papermaking (mainly paper towels), diaper manufacturing, as well as crop controlled irrigation in dry areas.

Peat Moss Wetting.

KFP have been used as a wetting and water retention agent in a peat moss sample. The sample was obtained from a commercial distributor. Two different surfactants (similar to those used in the peat moss industry) were added to the sample at a dosage of 800 mL/m$^3$. Table 7 reports an improvement of about 50% in water absorption with these surfactants. Another sample was mixed with KFP (90% peat moss/10% KFP). In this case, the amount of water retained in the sample was almost doubled (94% improvement) and the water was retained more strongly in the peat moss (higher resistance to drainage by pressure). Finally, to evaluate a possible synergistic effect between the surfactants and KFP, two more samples of the 90% peat moss/10% KFP were treated with 800 mL/m$^3$ of each surfactant. In this case, the additional gain in water absorption obtained with the surfactants is about 20 to about 30%.

TABLE 7

Water absorption capacity of a commercial peat moss sample treated with KFP and different surfactants

| Sample | Water absorption (g water/g peat moss) |
|---|---|
| Peat Moss alone | 1.97 |
| Peat Moss + Surfactant 1 | 3.01 |
| Peat Moss + Surfactant 2 | 2.89 |
| Peat Moss + KFP | 3.82 |
| Peat Moss + KFP + Surfactant 1 | 4.29 |
| Peat Moss + KFP + Surfactant 2 | 4.01 |

Heat & Sound Insulation.

Due to their high anionic charge, KFP have a tendency to repulse each other thus forming a very open structure with a low specific volume. They also have a very high elastic return after compression. These properties make KFP a potential insulation material. It is well known that lignocellulosic fibers have a very low thermal conductivity (about 0.045 W/mK for cellulose). The thermal conductivity of KFP is very similar to untreated fibers. However, because of the very low bulk of KPF mats, the actual amount of fibers needed to obtain the same mat thickness (and same thermal conductivity) as untreated fibers is much lower. Kraft (KF) and KFP mats (22 cm×22 cm) were produced with the same mass of fibers. The thermal conductivity of the two mats is reported in TABLE 8. The thermal conductivity (W/mK) is similar for KF and KFP. However, the KFP mat is 25% thicker. In consequence, a 25% reduction of the amount of fiber is possible with KFP for the same insulating effect.

TABLE 8

| Thermal Conductivity Tests Made on KF and KFP | | |
|---|---|---|
| Sample | Thickness (mm) | Thermal Conductivity (W/mK) |
| KF | 2.62 | 0.034 |
| KFP | 3.28 | 0.032 |

The embodiments of paragraphs [0023] to [00203] of the present disclosure are presented in such a manner in the present disclosure so as to demonstrate that every combination of embodiments, when applicable, can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the various embodiments of paragraphs [0023] to [00203] as well as the various embodiments of paragraphs [006] to [0022] are hereby covered by the present disclosure.

REFERENCES

Inagaki, N., Nakamura, S., Asai, H., Katsuura, K. Phosphorylation of cellulose with phosphorous acid and thermal degradation of the product. Journal of Applied Polymer Science, 20 (10), 2829-2836, (1976).

Pieschel, F., Lange, E., Camacho, J., Körber, H. Starch phosphates method for the production thereof and their use. United States patent, (2004).

Shi, Y., Belosinschi, D., Brouillette, F., Belfkira, A., Chabot, B. Phosphorylation of Kraft fibers with phosphate esters. Carbohydrate Polymers, 106, 121-127, (2014).

Shi, Y., Belosinschi, D., Brouillette, F., Belfkira, A., Chabot, B. The properties of phosphorylated Kraft Fibers. BioResources, 10 (3), 4375-4390, (2015).

Belosinschi, D. Coating of phosphate esters dispersions for the production of release paper. Doctoral thesis (in French). Quebec University at Trois-Rivieres, (2014).

Tracy, J. D., Reierson, L. R. Commercial synthesis of monoalkyl phosphates. Journal of surfactants and detergents, 5 (2), 169-172, (2002).

What is claimed is:

1. A lignocellulosic material comprising phosphorylated lignocellulosic fibers, wherein said fibers have an ionic charge in water of about 4000 to about 7000 mmoles/kg, wherein said fibers have an average fiber length of about 0.5 to about 5 mm; and wherein said material has an elemental phosphorus content of about 9 to about 15% (w/w).

2. The lignocellulosic material of claim 1, wherein said material, when reacted with water, is effective for absorbing about 30 to about 50 times its own weight of water.

3. The lignocellulosic material of claim 1, wherein said material has a Limit Oxygen Index value of about 25 to about 75.

4. The lignocellulosic material of claim 3, wherein the Limit Oxygen Index value is about 25 to about 55.

5. The lignocellulosic material of claim 3, wherein the Limit Oxygen Index value is about 30 to about 60.

6. The lignocellulosic material of claim 1, wherein said material has a metal adsorption capacity of at least 1.7 mmoles/g for at least one heavy metal.

7. The lignocellulosic material of claim 1, wherein said fibers are phosphorylated Kraft fibers.

8. The lignocellulosic material of claim 7, wherein the average fiber length is about 0.8 to about 3 mm.

9. The lignocellulosic material of claim 8, wherein the ionic charge in water is about 5000 to about 6500 mmoles/kg.

10. The lignocellulosic material of claim 9, wherein said material has a metal adsorption capacity of about least 1.7 mmoles/g to about 2.9 mmoles/g for at least one heavy metal.

11. The lignocellulosic material of claim 10, wherein said material, when reacted with water, is effective for absorbing about 30 to about 50 times its own weight of water.

12. The lignocellulosic material of claim 1, said fibers have an said material has an elemental phosphorus content of about 9 to about 13% (w/w).

13. The lignocellulosic material of claim 1, wherein the average fiber length is about 0.5 to about 4 mm.

14. The lignocellulosic material of claim 1, wherein the average fiber length of about 1 to about 4 mm.

15. The lignocellulosic material of claim 1, wherein the ionic charge in water is about 4500 to about 6500 mmoles/kg.

16. The lignocellulosic material of claim 1, wherein the ionic charge in water is about 5000 to about 6000 mmoles/kg.

17. The lignocellulosic material of claim 1, wherein said material has a metal adsorption capacity of about least 1.5 mmoles/g to about 3.5 mmoles/g for at least one heavy metal.

18. The lignocellulosic material of claim 17, wherein the at least one heavy metal is chosen from Ni, Cu, Cd and Pb.

19. The lignocellulosic material of claim 17, wherein the at least one heavy metal is chosen from Fe, Cu, Mn, Co, Ni and Cd.

20. The lignocellulosic material of claim 17, wherein said material, when reacted with water, is effective for absorbing about 30 to about 50 times its own weight of water.

* * * * *